(12) United States Patent
Yamagishi et al.

(10) Patent No.: US 7,281,253 B2
(45) Date of Patent: Oct. 9, 2007

(54) RECORDING OR REPRODUCING APPARATUS TO WHICH RECORDING MEDIUM IS DETACHABLY ATTACHED

(75) Inventors: Hiromasa Yamagishi, Ikoma (JP); Tooru Omosako, Yao (JP); Yoshiharu Akashi, Daito (JP)

(73) Assignee: Sanyo Electric Co., Ltd., Osaka (JP)

( * ) Notice: Subject to any disclaimer, the term of this patent is extended or adjusted under 35 U.S.C. 154(b) by 467 days.

(21) Appl. No.: 10/485,815

(22) PCT Filed: Sep. 13, 2002

(86) PCT No.: PCT/JP02/09473

§ 371 (c)(1),
(2), (4) Date: Feb. 10, 2004

(87) PCT Pub. No.: WO03/027945

PCT Pub. Date: Apr. 3, 2003

(65) Prior Publication Data

US 2004/0218416 A1 Nov. 4, 2004

(30) Foreign Application Priority Data

| Sep. 20, 2001 | (JP) | ............................ 2001-286092 |
| Sep. 20, 2001 | (JP) | ............................ 2001-286150 |
| Sep. 21, 2001 | (JP) | ............................ 2001-288016 |
| May 31, 2002 | (JP) | ............................ 2002-158447 |

(51) Int. Cl.
*G11B 17/04* (2006.01)
*G11B 33/02* (2006.01)

(52) U.S. Cl. ....................... 720/614; 720/613

(58) Field of Classification Search ................ 720/613, 720/614
See application file for complete search history.

(56) References Cited

U.S. PATENT DOCUMENTS

| 4,755,978 | A | * | 7/1988 | Takizawa et al. ......... 369/30.94 |
| 4,833,554 | A | * | 5/1989 | Dalziel et al. ........... 360/98.04 |
| 5,652,683 | A | * | 7/1997 | Bryer ......................... 360/96.5 |
| 5,668,793 | A | * | 9/1997 | Ogawa et al. .............. 720/648 |
| 5,675,566 | A | * | 10/1997 | Kosaka et al. ............. 720/631 |
| 6,330,151 | B1 | * | 12/2001 | Bates, III .................... 361/686 |
| 6,339,583 | B1 | * | 1/2002 | Watanabe et al. ........... 720/728 |
| 6,954,939 | B2 | * | 10/2005 | Yamagishi et al. ......... 720/635 |

FOREIGN PATENT DOCUMENTS

JP 7-244711 9/1995

* cited by examiner

*Primary Examiner*—Angel Castro
*Assistant Examiner*—Christopher R. Magee
(74) *Attorney, Agent, or Firm*—Edwards Angell Palmer & Dodge LLP

(57) ABSTRACT

A tray for transporting a recording medium toward or away from a connector is provided with an auxiliary tray coupled thereto, and the auxiliary tray has a pusher for pressing the recording medium as placed on the tray against the connector. A chassis is provided with a pressure fitting mechanism for moving the auxiliary tray toward the connector, with the recording medium transported by the tray to a position opposed to the connector, and the pressure fitting mechanism causes the pusher to press the recording medium into the connector. The chassis is also provided with a guide mechanism for causing the auxiliary tray to escape downward from the path of movement of the tray, with no recording medium inserted in the tray.

6 Claims, 9 Drawing Sheets

PRIOR ART

RECORDING OR REPRODUCING APPARATUS TO WHICH RECORDING MEDIUM IS DETACHABLY ATTACHED

BACKGROUND OF THE INVENTION

1. Field of the Invention

The present invention relates to recording or playback devices into which a recording medium is automatically inserted and which is internally provided with a connector fittable to the recording medium.

2. Background Art

FIG. 14A and FIG. 14B are plan views schematically showing a conventional recording or playback device (see JP-A NO. 1995-244711). This device is so adapted that an IC card serving as a recording medium is automatically insertable thereinto. The direction in which the recording medium is inserted will hereinafter be referred to as the "front," and the direction in which is the medium is discharged as the "rear." The recording medium 6 is provided at its front end with a first connector 60. A chassis 1 of the device is provided at its front end with a second connector 7 fittable to the first connector 60. The chassis 1 has a tray 4 for placing the recording medium 6 thereon. The tray 4 is movable forward and rearward by a drive cam 3 mounted on the chassis 1 and to be driven by a motor and a lever 97 fitting in a cam groove 33 in the drive cam 3. The tray 4 advances with the recording medium 6 supported thereon, whereby the first connector 60 is fitted and electrically connected to the second connector 7. In this state, data is recorded on or reproduced from the medium 6 through the second connector 7.

However, the conventional device has the following problems.

1. If the first connector 60 is inadvertently disengaged from the second connector 7, data cannot be recorded on or reproduced from the recording medium 6, so that the two connectors 60, 7 must be fitted to each other reliably. Accordingly, the two connectors 60, 7 must be fitted together with great strength.
2. Before the recording medium 6 as placed on the tray 4 is positioned as opposed to the second connector 7, the tray 4 needs only to be transported and therefore need not be moved with a great force. It is rather required to move the tray 4 promptly to shorten the time taken until the recording or reproduction operation is started after the medium 6 is placed on the tray 4.
3. The conventional device involves the likelihood that the two connectors 60, 7 will not accurately fit with each other because the recording medium 6 backlashes upward or downward within the tray 4 or the tray 4 backlashes upward or downward relative to the chassis 1, consequently displacing the connector 60 from the other connector 7 upward or downward.

An object of the present invention is to fit a connector of a recording medium reliably to a connector inside a device. Another object of the invention is to quickly move a tray when the load thereon is small or to move the tray at a low speed with a great fore when the load thereon is great.

SUMMARY OF THE INVENTION

A tray 4 for transporting a recording medium 6 toward or away from a connector 7 is provided with an auxiliary tray 5 coupled thereto, and the auxiliary tray 5 has a pusher 54 for pressing the recording medium 6 as placed on the tray 4 against the connector 7.

A chassis 1 is provided with a pressure fitting mechanism for moving the auxiliary tray 5 toward the connector 7, with the recording medium 6 transported by the tray 4 to a position opposed to the connector 7, and the pressure fitting mechanism causes the pusher 54 to press the recording medium 6 into the connector 7.

The chassis is also provided with a guide mechanism for causing the auxiliary tray 5 to escape downward from the path of movement of the tray 4, with no recording medium 6 inserted in the tray 4.

A drive cam 3 for moving the tray 4 is provided with a toothed face 30 in mesh with rack 46 of tray 4 while the recording medium 6 is in a state between an ejected state as discharged from the tray 4 and the state thereof immediately before fitting to the connector 7, and with a cam groove 33 for driving the tray 4 when the recording medium 6 is fitted to or released from the connector 7.

The drive cam 3 is rotatably mounted on the chassis 1, and the cam groove 33 has at a terminal end thereof a circular-arc portion 34 substantially centered about the center of rotation of the drive cam 3, the tray 4 being associated with the circular-arc portion 34 when the recording medium 6 is pressed into fitting contact with the connector 7.

The tray 4 is provided with a spring member for biasing the front end portion of the recording medium 6 upward or downward. At least one of the recording medium 6 and the connector 7 has a guide portion for guiding the recording medium 6 to the connector 7 while correcting the posture of the medium 6 before the medium 6 is fitted to the connector 7.

DETAILED DESCRIPTION OF EXEMPLARY EMBODIMENTS

First Embodiment

An embodiment of the present invention will be described below in detail with referenced to the drawings concerned.

Figure 7:
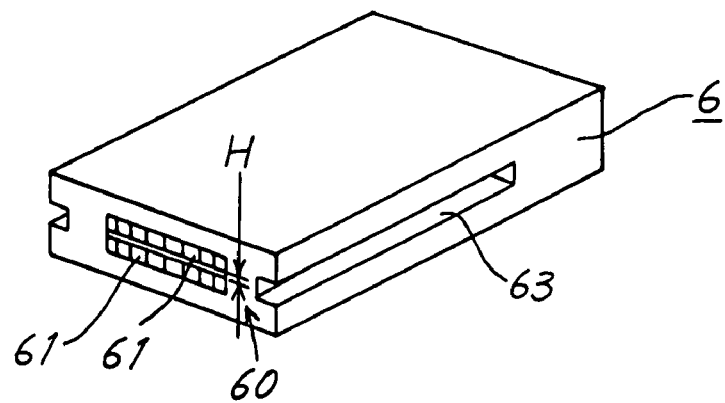
FIG. 7 is a perspective view of a recording medium.

FIG. 7 is a perspective view of a recording medium 6, which has a first connector 60 at one end thereof. The first connector 60 comprises many contacts arranged horizontally in upper and lower two separate rows 61, 61, with a clearance H formed between the two contact rows 61, 61.

Each side wall of the recording medium 6 has a guide groove 63 which extends forward or rearward and in which a side end of the first connector 60 is opened. The recording medium 6 may be in the form of a box adapted to record video images, music or like information therein, or an IC card having identification information recorded thereon.

Figure 9:
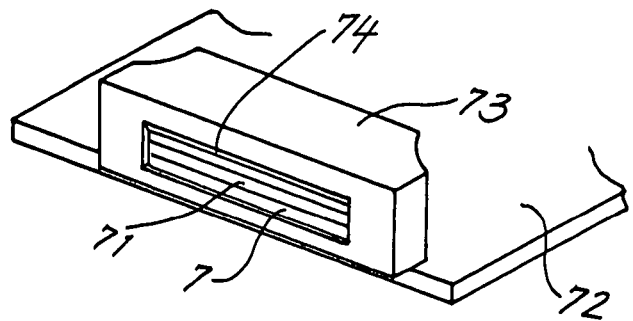
FIG. 9 is a perspective view of a second connector.
Figure 10:
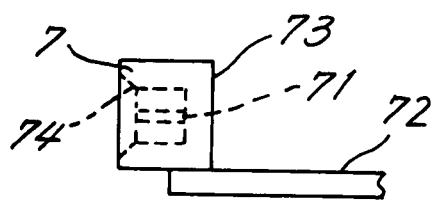
FIG. 10 is a side elevation of the second connector.

FIG. 9 is a perspective view of a second connector 7 to which the first connector 60 is fittable, and FIG. 10 is a right side elevation of the second connector 7. The second connector 7 is provided in a case 73 mounted on a circuit board 72. The second connector 7 has in its interior a horizontal plate 71 which fits into the clearance H of the first connector 60, whereby the two connectors 60, 7 are fitted to each other. Alternatively, the clearance H may be provided in the second connector 7, with the horizontal plate 71 provided in the first connector 60. Each of the connectors 60, 7 may be provided with a guide portion, such as a chamfered portion 74, at the inlet of its fitting portion, i.e., at the inner peripheral edge thereof.

Figure 1:
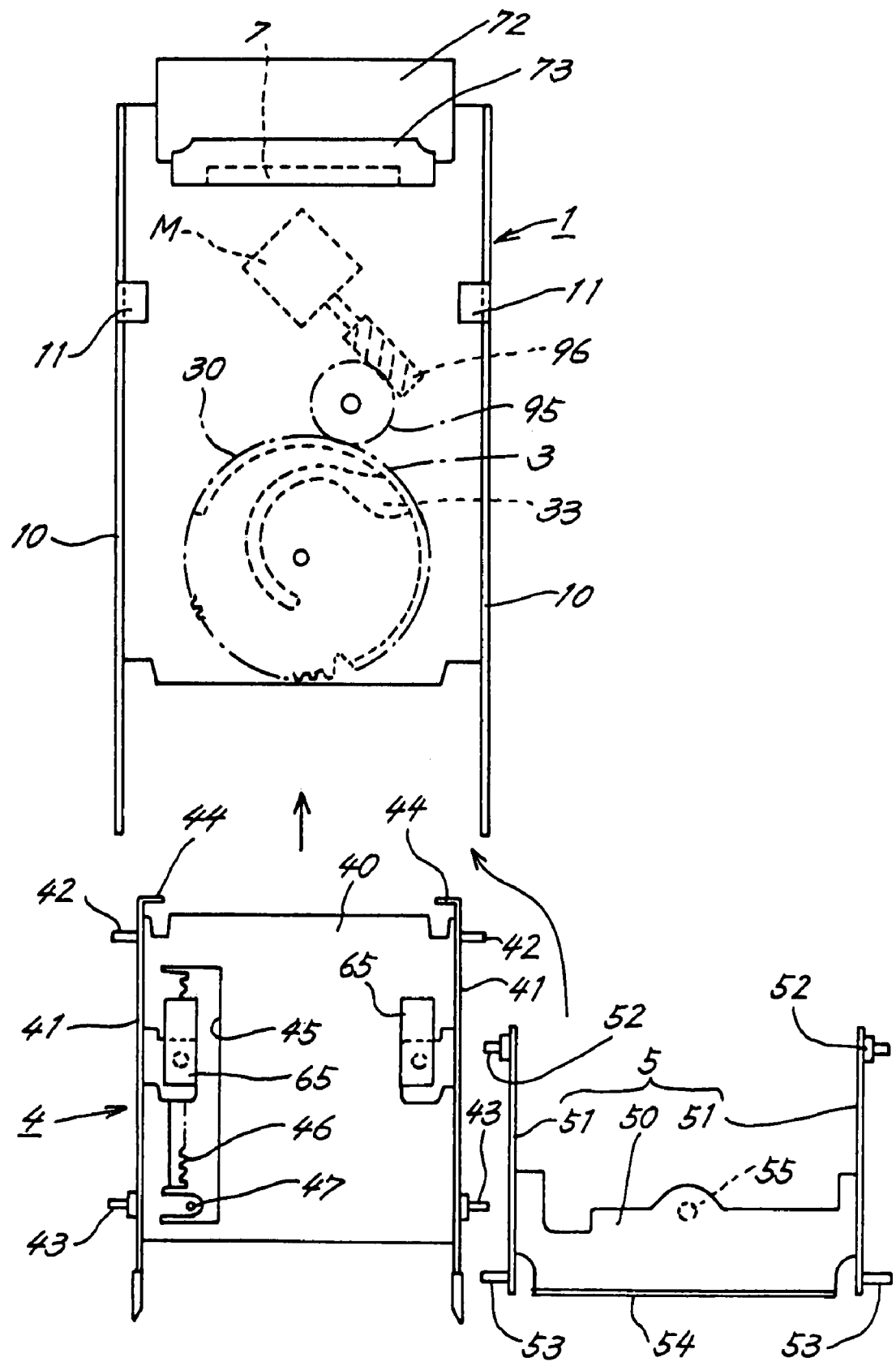
FIG. 1 is an exploded plan view of a device embodying the present invention.

FIG. 1 is an exploded plan view of a device according to the present embodiment. A pair of side plates 10, 10 extend upward from a chassis 1, and a tray 4 and an auxiliary tray 5 are arranged between the side plates 10, 10. The second connector 7 and the circuit board 72 are provided at the front end of the chassis 1. Restraining pieces 11, 11 extend inward from the respective side plates 10, 10 for preventing the tray 4 from advancing with no recording medium 6 placed thereon as will be described later.

The tray 4 has side walls 41, 41 extending upward from respective opposite sides of a bottom plate 40 for placing the recording medium 6 thereon. Projecting outward from each side wall 41 are a first projection 42 at its front end and a second projection 43 which is a stepped pin and positioned at its rear end. Stoppers 44, 44 for preventing the medium 6 from advancing to excess are provided at the front end of the bottom plate 40. The bottom plate 40 has a window hole 45 and is provided with a rack 46 and a push pin 47 which are positioned inwardly of the window hole 45 at a lower level than the plate 40. Plate springs 65, 65 for exerting pressure on the recording medium 6 are provided at the upper ends of the respective side walls 41, 41.

The auxiliary tray 5 has side walls 51, 51 extending upward from respective opposite sides of a bottom plate 50 for placing the recording medium 6 thereon. Projecting outward from each of the side walls 51, 51 are a third projection 52 which is a stepped pin and positioned at the front end of the wall and a fourth projection 53 at the rear end thereof. The bottom plate 50 is provided with a pusher 54 at its rear end for pushing the rear end of the recording medium 6 and with a fitting pin 55 projecting from the lower side thereof.

The chassis 1 is rotatably provided on the rear side of its bottom wall with a circular drive cam 3 having a toothed outer peripheral face 30. The drive cam 3 is driven by a motor M via an intermediate gear 95 and a worm 96. The toothed periphery or face 30 of the drive cam 3 is in mesh with a rack 46 of the tray 4.

Figure 2:
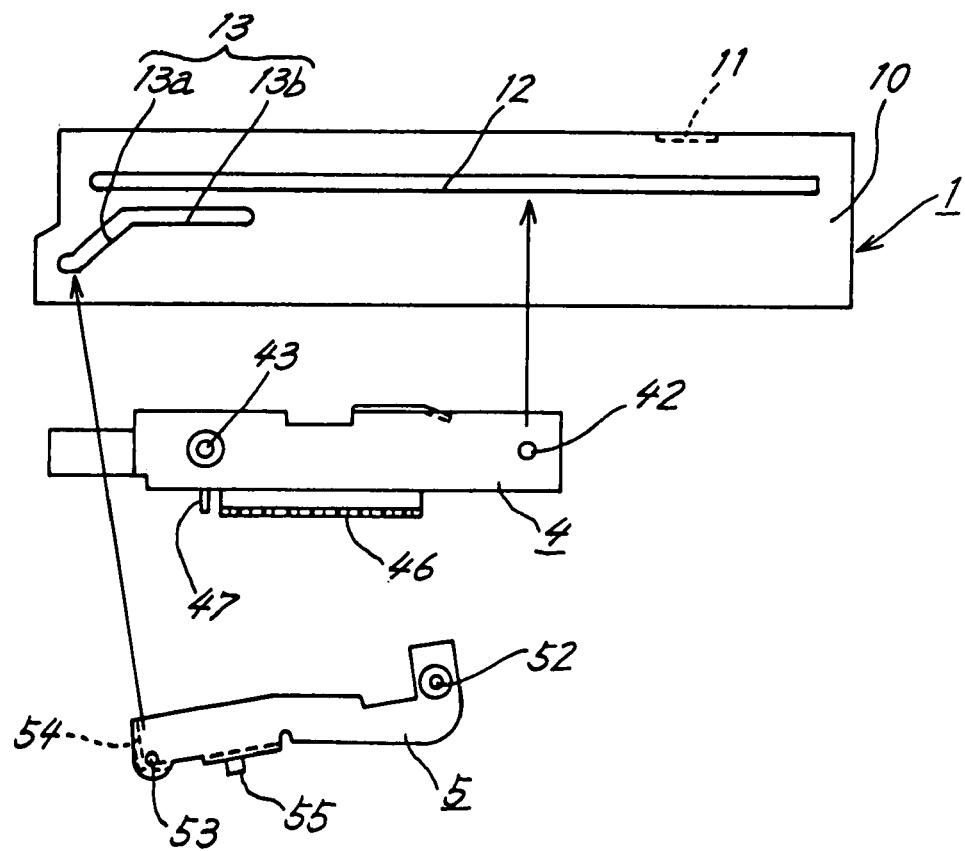
FIG. 2 is a right side elevation of a side plate of a chassis.

FIG. 2 is a right side elevation of the side plate 10 of the chassis 1. The side plate 10 has a horizontal slit 12 for the first projection 42 and the second projection 43 of the tray 4 and the third projection 52 of the auxiliary tray 5 to fit in, and a guide slit 13 for the fourth projection 53 of the auxiliary tray 5 to fit in. The second projection 43 is positioned to the rear of the third projection 52. The guide slit 13 comprises a first guide portion 13a slating upwardly forward, and a second guide portion 13b extending horizontally forward from the upper end of the first guide portion 13a.

Figure 3A:
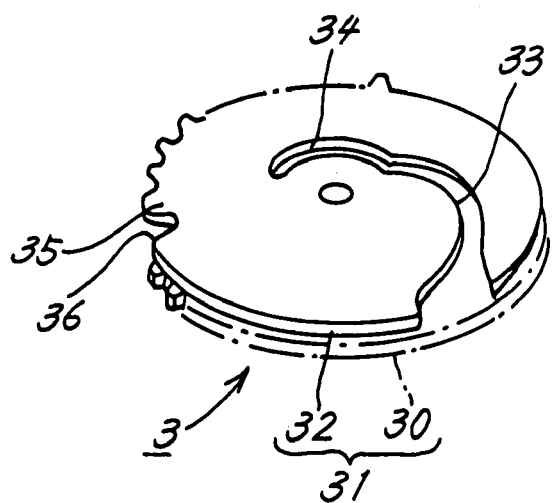
FIG. 3A is a perspective view of a drive cam as it is seen from above.
Figure 3B:
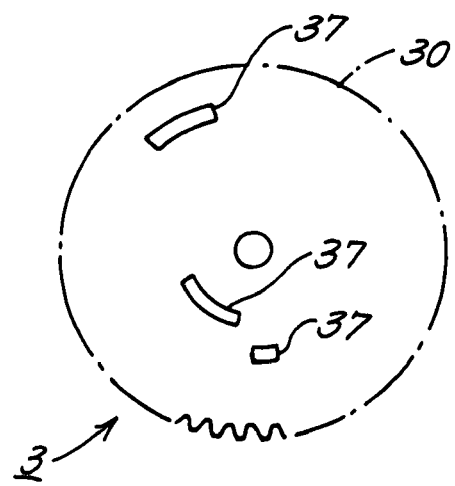
FIG. 3B is a rear view of the drive cam.

FIG. 3A is a perspective view of the drive cam 3 as it is seen from above, and FIG. 3B is a rear view of the drive cam 3. The drive cam 3 is partly stepped to form two portions as arranged in the direction of thickness of the cam 3. The lower half of the stepped portion 31 has the toothed face 30, and the upper half thereof provides a cylindrical portion 32 having approximately the same diameter as the pitch circle of the toothed face 30. The portion of the drive cam 3 other than the stepped portion 31 has the toothed face 30 over the entire thickness of the cam 3. A cam groove 33 having an opening at one end thereof is formed in the upper surface of the drive cam 3. The other end portion of the cam groove 33 is in the form of a circular-arc portion 34 concentric with the cam 3. Large teeth 35 and a recessed portion 36 adjacent to the large teeth 35 are formed along the outer periphery of the cylindrical portion 32.

Protrusions 37, 37, 37 are locally formed on the rear side of the drive cam 3. The projection 37 pushes one of sensor switches (not shown) provided below the cam 3 in corresponding relation with the angle of rotation of the drive cam 3 to detect the recording medium 6 in an ejected state as completely discharged from the tray 4, or the medium 6 as completely inserted into the tray 4 and fitted to the second connector 7.

Insertion Movement of the Recording Medium

Figure 4A:
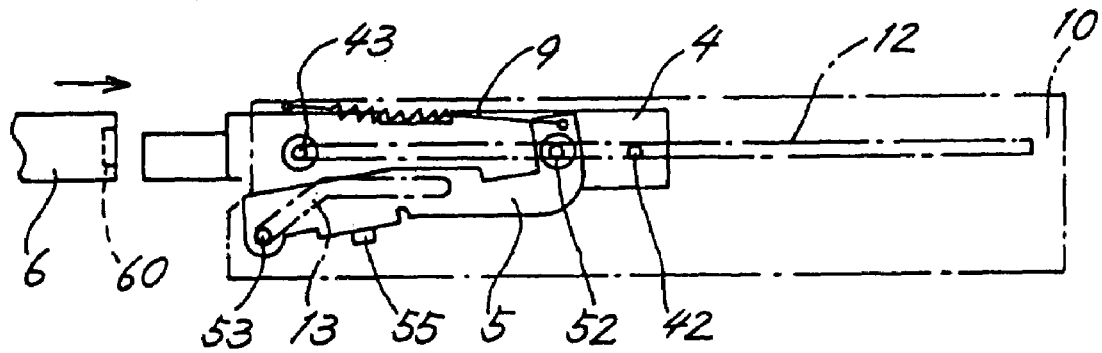
FIG. 4A to FIG. 4D are side elevations showing the movement of a tray and an auxiliary tray from an ejected state to a completely inserted state.
Figure 4B:
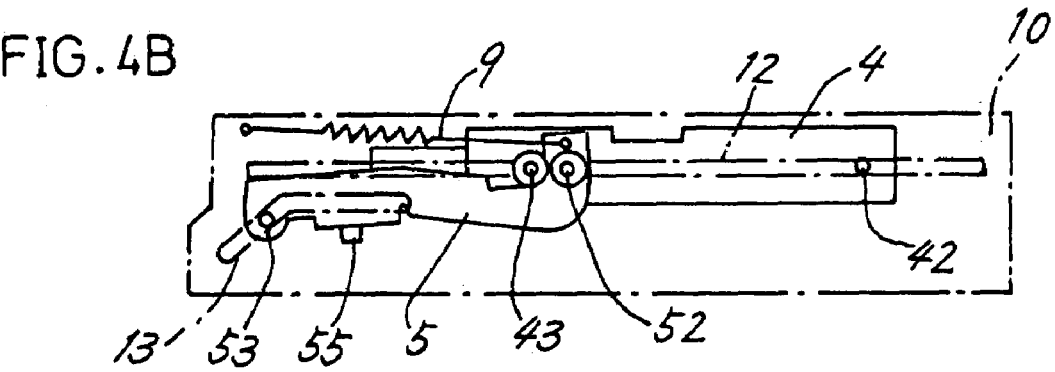
Figure 4C:
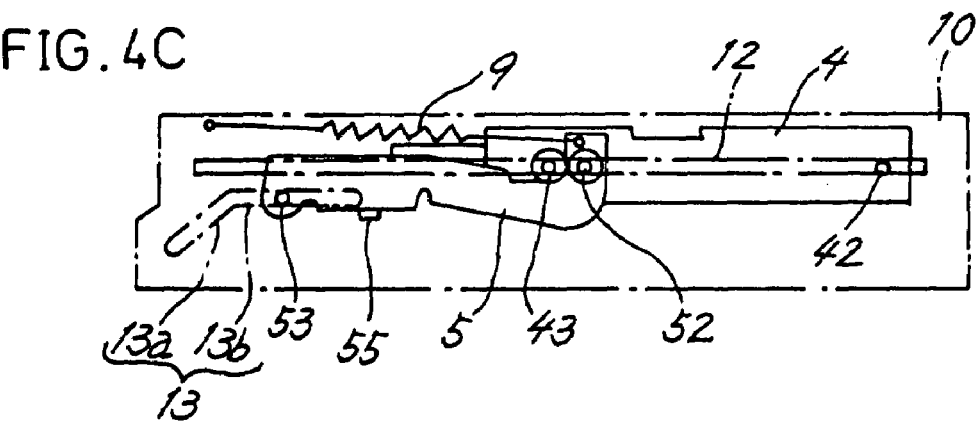
Figure 4D:
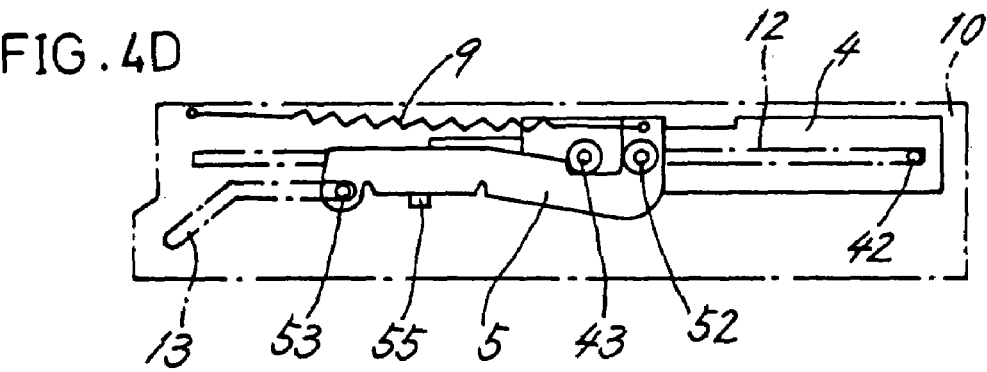
Figure 5A:
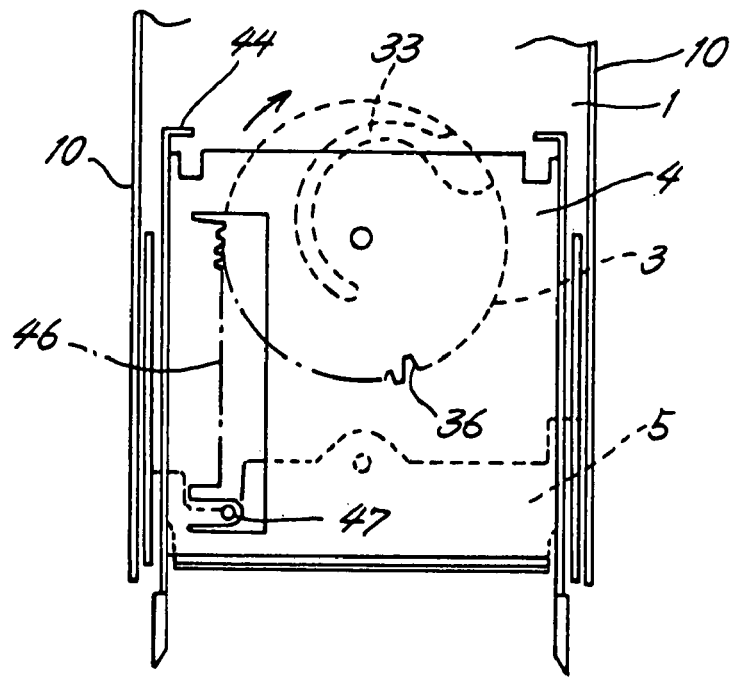
FIG. 5A and FIG. 5B are plan views showing the movement of the tray and the auxiliary tray.
Figure 5B:
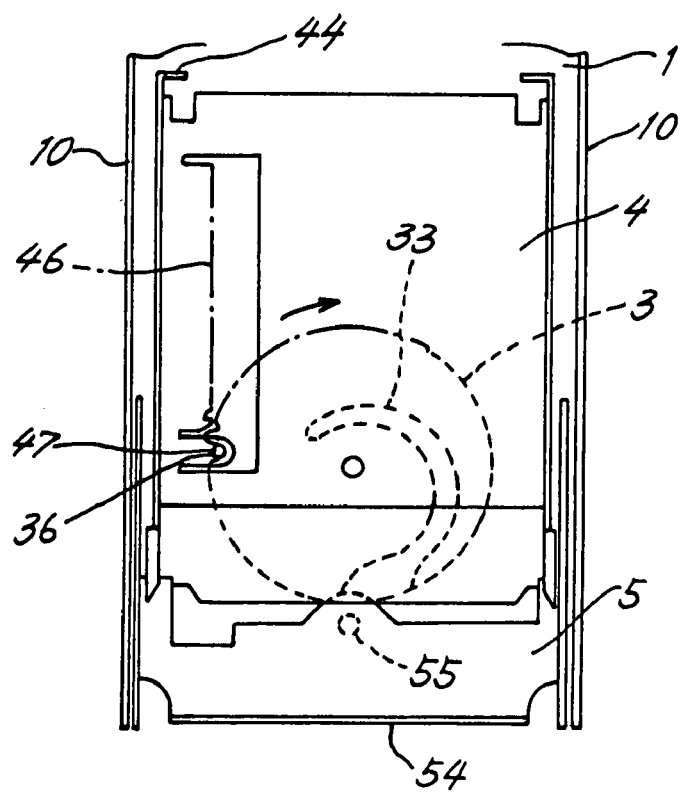
Figure 6:
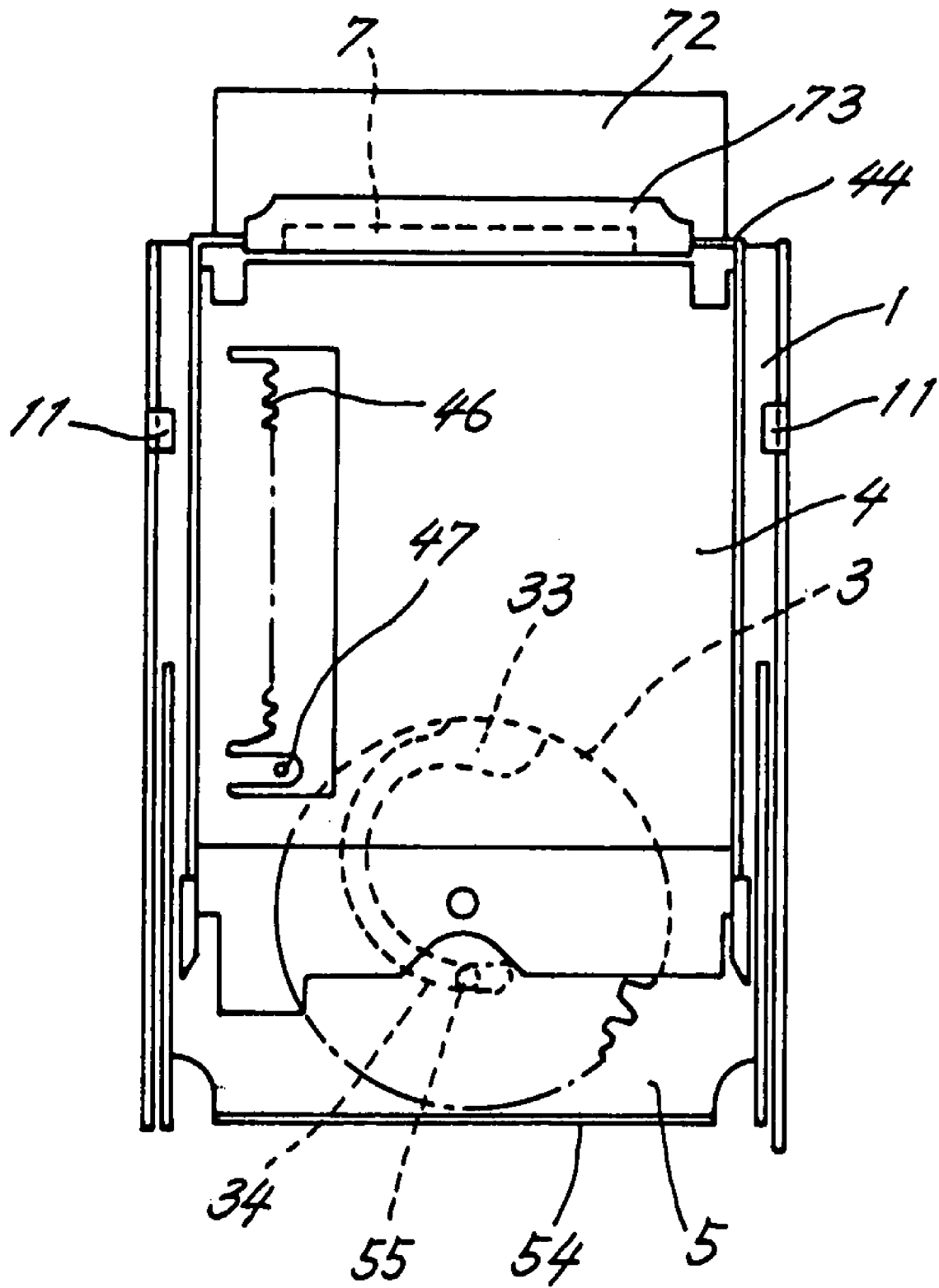
FIG. 6 is a plan view showing the movement of the tray and the auxiliary tray.

FIG. 4A to FIG. 4D are right side elevations showing the movement of the tray 4 and the auxiliary tray 5 from the medium ejected state to the insertion completed state, and FIG. 5A, FIG. 5B and FIG. 6 are plan views of the same. The recording medium 6 is not shown in FIGS. 4B to 6 for convenience sake. As shown in FIG. 4A to FIG. 4D, the auxiliary tray 5 is biased rearward by a tension spring 9 extending between and attached to the tray 5 and the side plate 10 of the chassis 1.

In the ejected state shown in FIGS. 5A and 4A, the rear end portion of the auxiliary tray 5 is in an escape position below the path of movement of the tray 4. This permits the recording medium 6 to be inserted into the tray 4 without being interfered with by the auxiliary tray 5. Since the tray 4 laps over the auxiliary tray 5 when in a standby state, the space for accommodating the tray 4 and the auxiliary tray 5 can be small.

When the recording medium 6 in the ejected state is inserted into the tray 4 as shown in FIG. 4A, the recording medium 6 pushes an insertion sensor switch provided on the tray 4 to energize the motor M.

When the drive cam 3 is rotated clockwise by the energization of the motor M, the tray 4 advances since the toothed periphery 30 of the drive cam 3 is in mesh with the rack 46. With the advance of the tray 4, the second projections 43 of the tray 4 push the third projections 52 on the auxiliary tray 5 as shown in FIG. 4B, advancing the auxiliary tray 5 against the tension spring 9. The auxiliary tray 5, which is in a tilted posture relative to the tray 4, has its posture corrected to a generally horizontal posture as shown in FIG. 4C and advances along the second guide portions 13b of the guide slits 13.

When the rack 46 is released from meshing engagement with the drive cam 3 as shown in FIG. 5B, the push pin 47 fits into the recessed portion 36 of the drive cam 3, which further advances the tray 4. The opening of the cam groove 33 is opposed to the fitting pin 55 of the auxiliary tray 5.

When the drive cam 3 further rotates, the fitting pin 55 fits into the cam groove 33, and the auxiliary tray 5 advances along the cam groove 33. Since the tray 4 has its push pin 47 released from the drive cam 3, the tray 4 is not moved directly by the drive cam 3. The pusher 54 of the auxiliary tray 5 pushes the rear end of the recording medium 6, pressing the first connector 60 of the medium 6 into fitting contact with the second connector 7 on the chassis 1. The recording medium 6 pushes the stoppers 44 and therefore pushes the tray 4 also forward.

The third projections 52 of the auxiliary tray 5 are released from the second projections 43 of the tray 4 as shown in FIG. 4D. The pusher 54 of the auxiliary tray 5 pushes the rear end of the recording medium 6, pressing the first connector 60 of the medium 6 into contact with the second connector 7 (see FIG. 1) on the chassis 1, whereby the two connectors 60, 7 are reliably fitted to each other. This eliminates the likelihood that the recording medium 6 will inadvertently become released from the connector 7. Further as shown in FIG. 6, the fitting pin 55 is positioned in the circular-arc portion 34 of the cam groove 33, so that even if fluctuations in the rotational load on the drive cam 3 produce variations in the angle of rotation of the drive cam 3, the auxiliary tray 5 remains free of displacement. Furthermore, the load of moving the tray 4 increases when pressing the connector 60 into fitting contact or engagement with the connector 7. However, with the fitting pin 55 fitting in the cam groove 33, the distance from the pin 55 to the center of the cam 3 is smaller than the radius of the cam 3, so that the auxiliary tray 5 is easily movable by the drive cam 3.

According to the present embodiment, the recording medium 6 is transported to the front end of the chassis 1 by the meshing engagement of the tray 4 with the drive cam 3. The auxiliary tray 5 is subsequently pushed by the cam groove 33 of the drive cam 3 to press the first connector 60 of the recording medium 6 into fitting engagement with the second connector 7 on the chassis 1. Thus, since the load on the drive cam 3 is small when transporting the tray 4, the tray 4 is caused to mesh with the toothed face 30 of the cam 3. Because the load on the drive cam 3 is great when pressing the two connectors 60, 7 into fitting engagement with each other, the cam groove 33 is then used. In this way, the single drive cam 3 serves to quickly move the tray 4 under a light load and also to move the tray 4 at a low speed with an increased force upon a change over from the quick movement. This ensures a suitable movement in accordance with the load on the tray 4. If the tray 4 is moved only by the cam groove 33, the stroke length of the tray 4 can not be made greater than the radius of the cam 3, whereas the tray 4 can be given an increased stroke length by moving the tray 4 using the toothed face 30 and the cam groove 33.

A movement reverse to the above is performed to eject the recording medium 6 from the device by disengaging the medium 6 from the second connector 7 and retracting the tray 4. The cam 3 drives the auxiliary tray 5 with the cam groove 33, causing the third projections 52 of the tray 5 to push the second projections 43 of the tray 4. The stoppers 44 push the front end of the recording medium 6 rearward to release the medium 6 from the second connector 7. The rack 46 of the tray 4 thereafter meshes with the toothed face 30 of the drive cam 3 to retract the tray 4. The auxiliary tray 5 moves down along the guide slits 13 so as not to interfere with the retraction of the tray 4.

Figure 8:
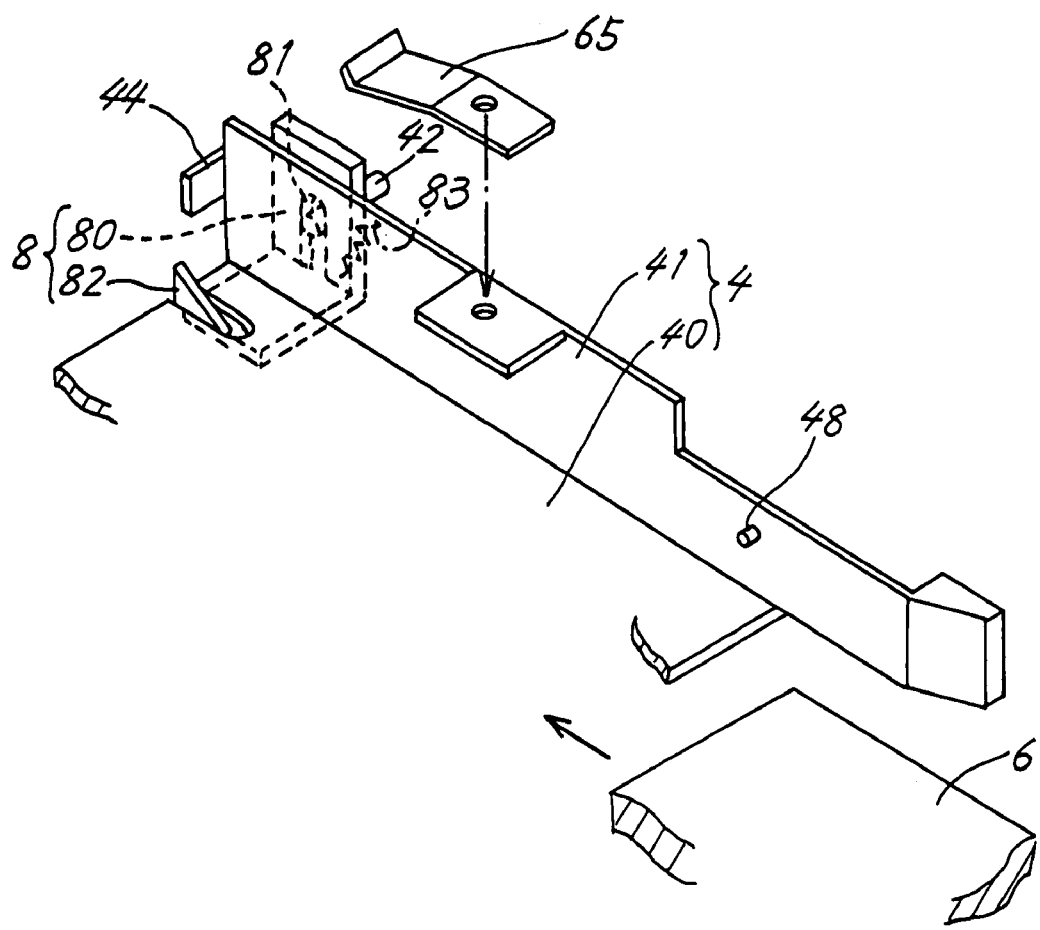
FIG. 8 is a perspective view partly broken away and showing the tray.

Incidentally as shown in FIG. 8, a restraining member 8 movable upward or downward may be provided at the front end of the tray 4 for preventing the tray 4 from moving forward without carrying the recording medium 6 thereon. The restraining member 8 comprises a vertical plate 80 provided with a slot 81 having the first projection 42 of the tray 4 fitting therein, and a kick piece 82 in contact with the bottom plate of the tray 4 and provided at the lower end of the vertical plate 80. The member 8 is biased upward by a spring 83. With no recording medium 6 placed on the tray 4, the upper end of the vertical plate 82 is positioned above the upper edge of the side plate 10, and the kick piece 82 is projected upward beyond the bottom plate 40 of the tray 4. When the tray 4 advances in this state, the upper end of the vertical plate 80 comes into contact with the restraining piece 11 (see FIG. 1) of the side plate 10, restraining the tray 4 from advancing.

When the recording medium 6 is placed into the tray 4, the bottom wall of the medium 6 depresses the kick piece 82 against the spring 83, retracting the upper end of the vertical plate 80 from the upper edge of the side plate 10. The tray 4 can then advance without being interfered with by the restraining piece 11.

Pressing Connectors into Fitting Engagement

Figure 11:
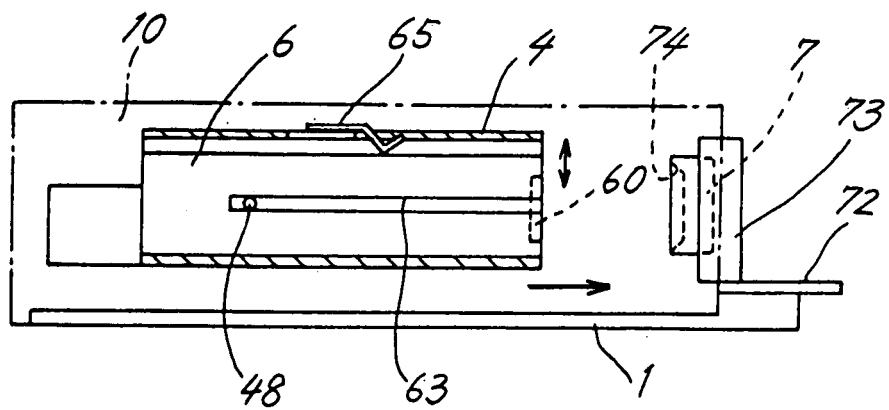
FIG. 11 is a side elevation in section and showing a first connector of the recording medium placed on the tray, immediately before the connector is fitted to the second connector.

FIG. 11 is a side elevation in section and showing the first connector 60 of the recording medium 6 placed on the tray 4, immediately before the connector 60 is fitted to the second connector 7. A pin 48 projects inward from each of the side walls 41 of the tray 4. The projecting pins 48 fit into the respective guide grooves 63 of the recording medium 6 and are positioned at the rear end of the medium 6. The recording medium 6 is depressed at a front end portion thereof by the plate springs 65. The front end of the recording medium 6 is therefore movable upward or downward about the projecting pins 48. In the state shown in FIG. 11, the first connector 60 is positioned slightly below the second connector 7.

Upon the first connector 60 of the recording medium 6 coming into contact with the second connector 7 with the advance of the tray 4, the medium 6 has its front end guided upward by the guide portion of the connector 7 which portion is the inlet chamfered portion 74 thereof. The medium 6 is smoothly fitted to the second connector 7 while being corrected in position with respect to the upward or downward direction. Thus, the recording medium 6 is smoothly fittable to the second connector 7 by virtue of the structure wherein the front end of the medium 6 is movable upward or downward about the projecting pins 48.

According to the above embodiment, the first connector 60 is initially positioned slightly downwardly of the second connector 7, and the front end of the recording medium 6 is corrected upward by a positioning projection 70. However, the first connector 60 may be initially positioned slightly upwardly of the second connector 7, such that the front end of the medium 6 is corrected downward by the positioning projection 70.

The recording medium 6 is guided upward or downward by the chamfered portion 74 or like guide portion. For guiding the medium in this way, however, a guide bore may be formed in the medium 6 for a positioning pin (not shown) fittable in the medium 6 and provided at a location on the chassis 1 other than the position of the second connector 7. Alternatively, a guide portion may be formed in the contour of the recording medium 6 itself and also in the case 73 of the second connector 7.

Second Embodiment

Figure 12A:
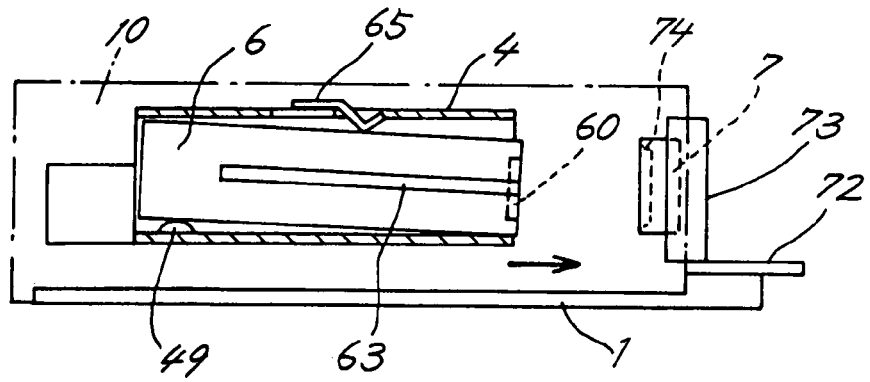
FIG. 12A is a side elevation in section and showing the first connector of the recording medium placed on a tray, immediately before the connector is fitted to a second connector according to another embodiment.
Figure 12B:
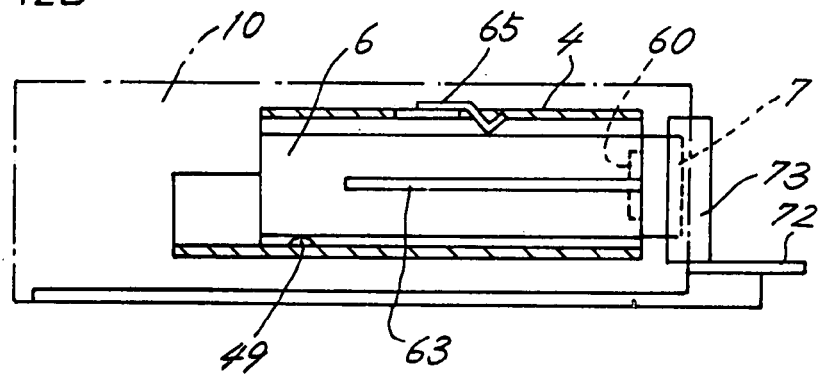
FIG. 12B is a side elevation in section and showing the first connector as fitted to the second connector.
Figure 13:
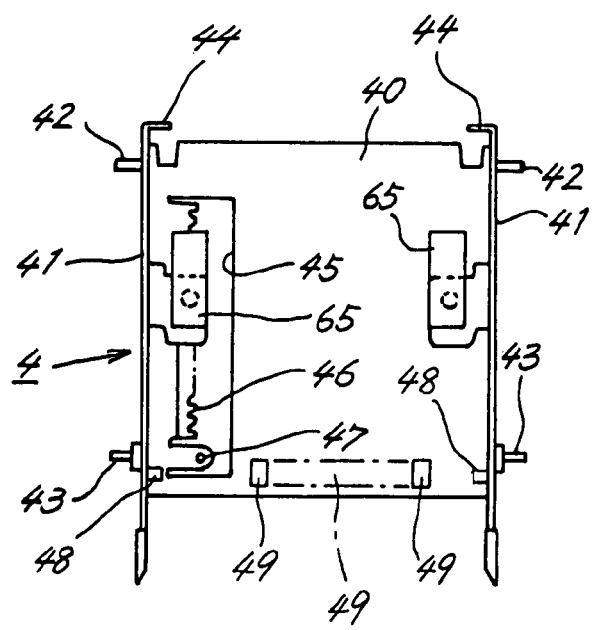
FIG. 13 is a plan view of the tray in FIG. 12.
Figure 14A:
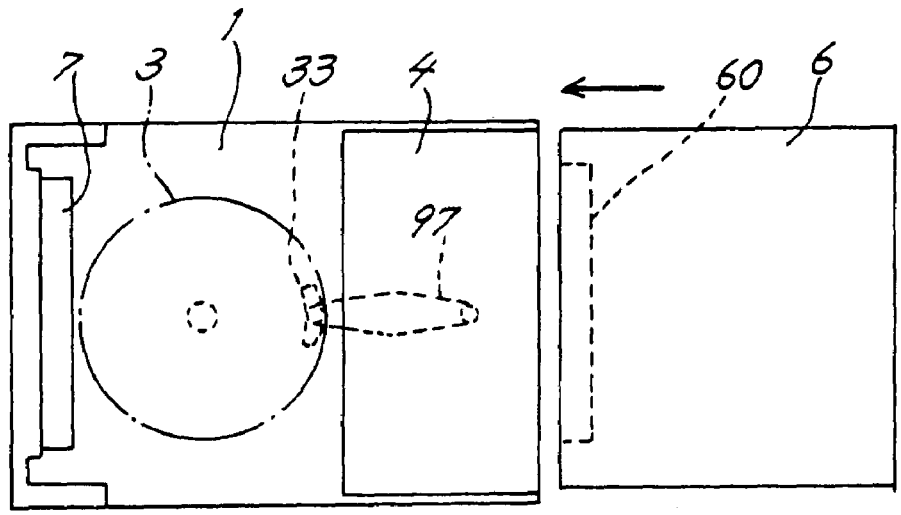
FIG. 14A and FIG. 14B are plan views schematically showing a conventional recording or playback device.
Figure 14B:
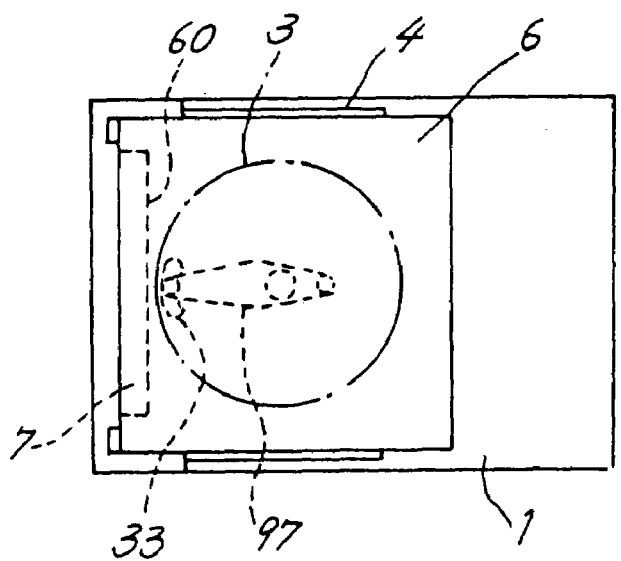

With reference to FIG. 12A and FIG. 12B, this embodiment has raising protuberances 49 on the bottom wall of a tray 4 at the rear end thereof for tilting the front end of the recording medium 6 slightly downward. The midportion of the first connector 60 with respect to the vertical direction is positioned below the midportion of a second connector 7 with respect to the vertical direction.

FIG. 12A is a side elevation in section and showing the first connector 60 of the recording medium 6 placed on the tray, immediately before the connector is fitted to the second connector according to the present embodiment, and an auxiliary tray 5 is not shown in this drawing. FIG. 12B is a side elevation in section and showing the first connector 60 of the recording medium 6 as fitted to the second connector 7 of the present embodiment.

The recording medium 6 has a front end portion depressed by plate springs 65. The raising protuberances 49 are provided at the rear end of the tray 4, whereby the front end of the recording medium 6 is tilted downward.

When the first connector 60 of the recording medium 6 comes into contact with the second connector 7 with the advance of the tray 4, the medium 6 has its front end guided upward by a guide portion, such as an inlet chamfered portion 74, of the connector 7. The medium 6 is smoothly fitted to the second connector 7 as shown in FIG. 12B while being corrected in position with respect to the upward or downward direction. The recording medium 6 has its bottom wall positioned substantially parallel to the chassis 1 and is placed in a generally horizontal position.

Although the applicant has conceived the idea of providing two raising protuberances 49, 49 as spaced apart laterally on the tray 4, one raising protuberance 49 extending laterally may be provided as indicated in a chain line. In the case of the present embodiment, the recording medium 6 may have no guide groove 63, and the projecting pin 48 fittable in the guide groove 63 may be dispensed with.

INDUSTRIAL APPLICABILITY

1. When the recording medium 6 is transported by the tray 4 to a position opposed to the connector 7, a pressure fitting mechanism functions, causing the pusher 54 of the auxiliary tray 5 to press the recording medium 6 against the connector 7 with a great force, whereby the medium 6 is reliably fitted to the connector 6.

Before the recording medium 6 is not inserted into the device by the guide mechanism, the auxiliary tray 5 is in an escape position below the path of movement of the tray 4. This permits the recording medium 6 to be inserted into the tray 4 without being interfered with by the auxiliary tray 5, also diminishing the space for accommodating the tray 4 and the auxiliary tray 5 since the tray 4 laps over the auxiliary tray 5 when in a standby state.

2. For moving the tray 4 from the medium ejected position to a position where the recording medium 6 is to be fitted to the connector 7, the tray 4 is brought into meshing engagement with the toothed face 30 of the drive cam 3. When pressing the recording medium 6 into fitting engagement with the connector 7 on the chassis 1, the cam 3 pushes the tray 4 with its cam groove 33.

Thus, since the load on the drive cam 3 is small when merely transporting the tray 4, the tray 4 is caused to mesh with the toothed face 30 of the cam 3. Because the load on the drive cam 3 is great when pressing the recording medium 6 into fitting engagement with the connector 7, the cam groove 33 is then used. In this way, the single drive cam 3 serves to quickly move the tray 4 under a light load and also to move the tray 4 at a low speed and yet with an increased force upon a changeover from the quick movement. This ensures a suitable movement in accordance with the load on the tray 4.

The tray 4 is movable also along the circular-arc portion of the cam groove 33 and is therefore free of displacement despite variations in the angle of rotation of the drive cam 3 due to fluctuations in the rotational load acting on the drive cam 3.

3. Even if the front end of the recording medium 6 is displaced upward or downward relative to the connector 7 when the medium 6 is advanced toward the connector 7, the front end is movable upward or downward about the projecting pins 48 or the raising protuberances 49. When coming into contact with the connector 7, therefore, the front end of the recording medium 6 is deflected upward or downward by the chamfered portion 74 or like guide portion and smoothly fittable to the connector 7. This ensures accurate fitting engagement between the medium 6 and the connector 7 on the chassis 1.

The invention claimed is:

1. A recording or playback device comprising as provided on a chassis, a connector electrically connectable to a recording medium, and a tray for transporting the recording medium in a direction toward or away from the connector, wherein an auxiliary tray is coupled to the tray and has a pusher for pressing the recording medium as placed on the tray against the connector, and wherein the chassis is provided with a pressure fitting mechanism for moving the auxiliary tray toward the connector, with the recording medium transported by the tray to a position opposed to the connector, the pressure fitting mechanism being operable to cause the pusher to press the recording medium into the connector.

2. A recording or playback device according to claim 1 wherein the chassis is provided with a guide mechanism for causing the auxiliary tray to escape downward from the path of movement of the tray, with no recording medium inserted in the tray.

3. A recording or playback device according to claim 2 wherein the guide mechanism has a guide slit formed in a side plate extending upward from the chassis, and the pressure fitting mechanism has a drive cam for driving the auxiliary tray.

4. A recording or playback device comprising as provided on a chassis, a connector electrically connectable to a recording medium, a tray for transporting the recording medium in a direction toward or away from the connector, and a drive cam coupled to the tray for moving the tray, wherein the drive cam is provided with a toothed face in mesh with a rack of said tray while the recording medium is in a state between an ejected state, as discharged from the tray, and the state thereof immediately before fitting to the connector, and with a cam groove for driving the tray when the recording medium is fitted to or released from the connector, wherein the tray is released from the cam groove of the drive cam in the ejected state.

5. A recording or playback device according to claim 4 wherein the drive cam is rotatably mounted on the chassis, and the cam groove has at a terminal end thereof a circular-arc portion substantially centered about the center of rotation of the drive cam, the tray being associated with the circular-arc portion when the recording medium is pressed into fitting contact with the connector.

6. A recording or playback device according to claim 5 wherein an auxiliary tray is coupled to the tray for pushing a rear end of the recording medium, and the auxiliary tray is fitted in the circular-arc portion when pressing the recording medium into fitting contact with the connector.

* * * * *